United States Patent [19]

Goolsbee

[11] Patent Number: 5,484,201
[45] Date of Patent: Jan. 16, 1996

[54] SYSTEM FOR THE RECOVERY OF OIL AND CATALYST FROM A CATALYST/OIL MIX

[76] Inventor: James A. Goolsbee, 2201 Locklane, Pasadena, Tex. 77502

[21] Appl. No.: 236,865

[22] Filed: May 2, 1994

Related U.S. Application Data

[63] Continuation of Ser. No. 830,233, Jan. 31, 1992, abandoned.

[51] Int. Cl.$^6$ .................. B01F 7/02; B01J 38/50
[52] U.S. Cl. .............. 366/15; 366/14; 366/184; 366/291; 366/297; 134/25.1; 134/60; 134/61; 502/22; 502/24; 502/29; 502/31
[58] Field of Search .................. 502/22, 24, 29, 502/31; 366/14, 15, 184, 291, 297; 134/25.1, 60, 61

[56] References Cited

U.S. PATENT DOCUMENTS

| | | | |
|---|---|---|---|
| 2,487,867 | 11/1949 | Griffin | 502/31 |
| 2,515,062 | 7/1950 | Smith | 502/31 |
| 3,429,805 | 2/1969 | Karbosky | 208/351 |
| 4,040,958 | 8/1977 | Rammler | 210/770 |
| 4,120,698 | 10/1978 | Atchison et al. | 75/82 |
| 4,172,782 | 10/1979 | Masuko et al. | 260/567 |
| 4,277,731 | 7/1981 | Taylor | 203/99 |
| 4,395,315 | 7/1983 | Zambrano | 423/150 |
| 4,415,541 | 11/1983 | Melin | 423/140 |
| 4,482,766 | 11/1984 | Stönner | 502/22 |
| 4,584,140 | 4/1986 | Blewett et al. | 260/412.8 |
| 4,661,265 | 4/1987 | Olson et al. | 210/804 |
| 4,888,104 | 12/1989 | Ramirez de Aqudelo | 208/112 |
| 4,937,218 | 6/1990 | Ramirez de Aqudelo | 502/152 |
| 5,008,001 | 4/1991 | Kitamura et al. | 208/143 |
| 5,013,533 | 5/1991 | Howard et al. | 423/133 |
| 5,046,856 | 9/1991 | McIntire | 366/291 |
| 5,059,331 | 10/1991 | Goyal | 210/748 |
| 5,080,721 | 1/1992 | Flanigan et al. | 210/768 |

*Primary Examiner*—Sharon Gibson
*Assistant Examiner*—Walter D. Griffin
*Attorney, Agent, or Firm*—Conley, Rose & Tayon

[57] ABSTRACT

The present invention discloses a method and apparatus for separating and recovering catalyst and oil from a catalyst/oil mix, using the steps of mixing the catalyst/oil mix with a solvent for the oil and dissolving the oil in the solvent, separating the catalyst from the solvent and dissolved oil and recovering the catalyst as a wet powder, and separating the dissolved oil from the solvent, whereby both the oil and the solvent are recovered in reusable form.

8 Claims, 2 Drawing Sheets

5,484,201

SYSTEM FOR THE RECOVERY OF OIL AND CATALYST FROM A CATALYST/OIL MIX

This is a continuation of application Ser. No. 07/830,233 filed on Jan. 31, 1992, now abandoned.

TECHNICAL FIELD OF THE INVENTION

This invention relates to solvent extraction. More particularly this invention relates to separation of organic material from a catalyst. Still more particularly, this invention discloses a method and apparatus for separating and recovering both the oil and spent catalyst from spent catalyst which is saturated with oil.

BACKGROUND OF THE INVENTION

Use of catalysts such as nickel for hydrogenation of oils in the edible oil industry is well known. A liquid oil or blend of oils from animal and vegetable sources is hydrogenated by exposure to hydrogen in the presence of a catalyst in order to change its physical properties and appearance. Typically such catalysts are in the form of a powder or similar solid which is suspended in or otherwise exposed to the oil. As a result of oxidation and other chemical changes in the catalyst, its usefulness as a catalyst will decrease over time, until it is no longer a viable catalyst. It is necessary to dispose of the spent catalyst that is generated by the system. Such oil-containing spent catalyst is presently placed in landfills or recovered by methods that allow recovery of the catalyst but do not allow recovery of the oil.

Because of economic considerations, it is desirable to recover and recycle the oil which is in the spent catalyst, as well as the catalyst itself. U.S. Pat. No. 5,008,001 discloses a method for recovering and recycling both the catalyst and the oil from a slurry containing spent catalyst. The method of 5,008,001 optionally includes the use of conventional solid-liquid separation to produce a catalyst cake and specifically includes heat drying of the oil containing catalyst slurry or cake to remove the oil and produce catalyst which is substantially free of oil. The oil removed in the heat drying process is recovered.

U.S. Pat. No. 4,277,316 discloses a solvent extraction process wherein solvents are separated from a solvent bearing material by distillation. The desired solvents are removed by the application of heat which is generated by the combustion of the noncondensable fraction of those solvents, while the condensable fraction is condensed and removed for storage. Following removal of the desired solvents at one predetermined temperature, the mixture is heated to a second predetermined temperature to remove the remaining organic materials, thereby leaving a residue which is substantially free of oil and can be removed from the container. The process is a batch process.

U.S. Pat. No. 4,395,315 discloses a method for removing nickel from a waste material containing organic material and small amounts of iron or aluminum. The method includes removing the organic impurities from the waste mixture by either calcining or washing in a Stoddard solvent, and leaching the resulting material with an acid. The method of 4,395,315 does not provide for recovery of the organic material.

The present invention discloses a method and apparatus for recovery of both oil and catalyst from a spent catalyst. The method of the present invention is economically efficient and environmentally sound and uses a relatively small amount of energy to recover usable oil from the spent catalyst. These and other advantages of the present invention will become apparent in the description below.

SUMMARY OF THE INVENTION

The present invention discloses a method and apparatus for separating and recovering catalyst and oil from a catalyst/oil mix, wherein the catalyst/oil mix is mixed with a solvent in a mixer and the oil is dissolved in the solvent, the catalyst is separated from the solvent and dissolved oil by gravity and recovered as a wet powder, and the dissolved oil is separated from the solvent in a fractionation column, so that both the oil and the solvent can be recovered in reusable form. The present invention avoids the production or release of environmentally undesirable substances, and has a high degree of heat recycle so that a minimum of energy is required to perform the separation.

DETAILED DESCRIPTION OF THE INVENTION

The present invention discloses a method and an apparatus for recovering both the oil and catalyst from an oil-containing spent catalyst, in a process which does not generate toxic effluents or other waste products and which is relatively energy efficient. In the steps of the present invention the catalyst/oil mixture is, in sequence: mixed with a portion of oil to obtain a pumpable consistency, mixed with a solvent, and then separated into two streams which contain, respectively, mostly catalyst and mostly oil-containing solvent. The stream which contains mostly catalyst is put through a vacuum dryer, where a portion of the solvent which remains in the stream is flashed off, and then undergoes stripping with hot inert gas to remove substantially all of the remaining oil and solvent, resulting in a dry catalyst powder. The stream containing most of the oil and the solvent is preheated and then fractionated to separate the oil from the solvent. The solvent is condensed and completely recovered and stored for reuse and the oil, after cooling, is sent to storage or recycle, depending on the needs of the incoming stream.

Catalysts used in the food industry and catalysts for which the recovery of the present invention is useful include nickel, copper, cadmium, and chromium. It will be understood, however, that the method and apparatus of the present invention is not limited in its application to these catalysts, and may be applicable in other situations where it is desired to separate and recover oils or fats from a solid. Such catalysts are usually in the form of a powdered, substantially pure metal. In the spent form, they are typically oxidized and may be poisoned with other undesired materials, as well as saturated with organic materials. Complete separation of the catalyst from the organics results in a product which may be sold as a raw material to other industries, or regenerated for re-use as a catalyst.

Figure 1:
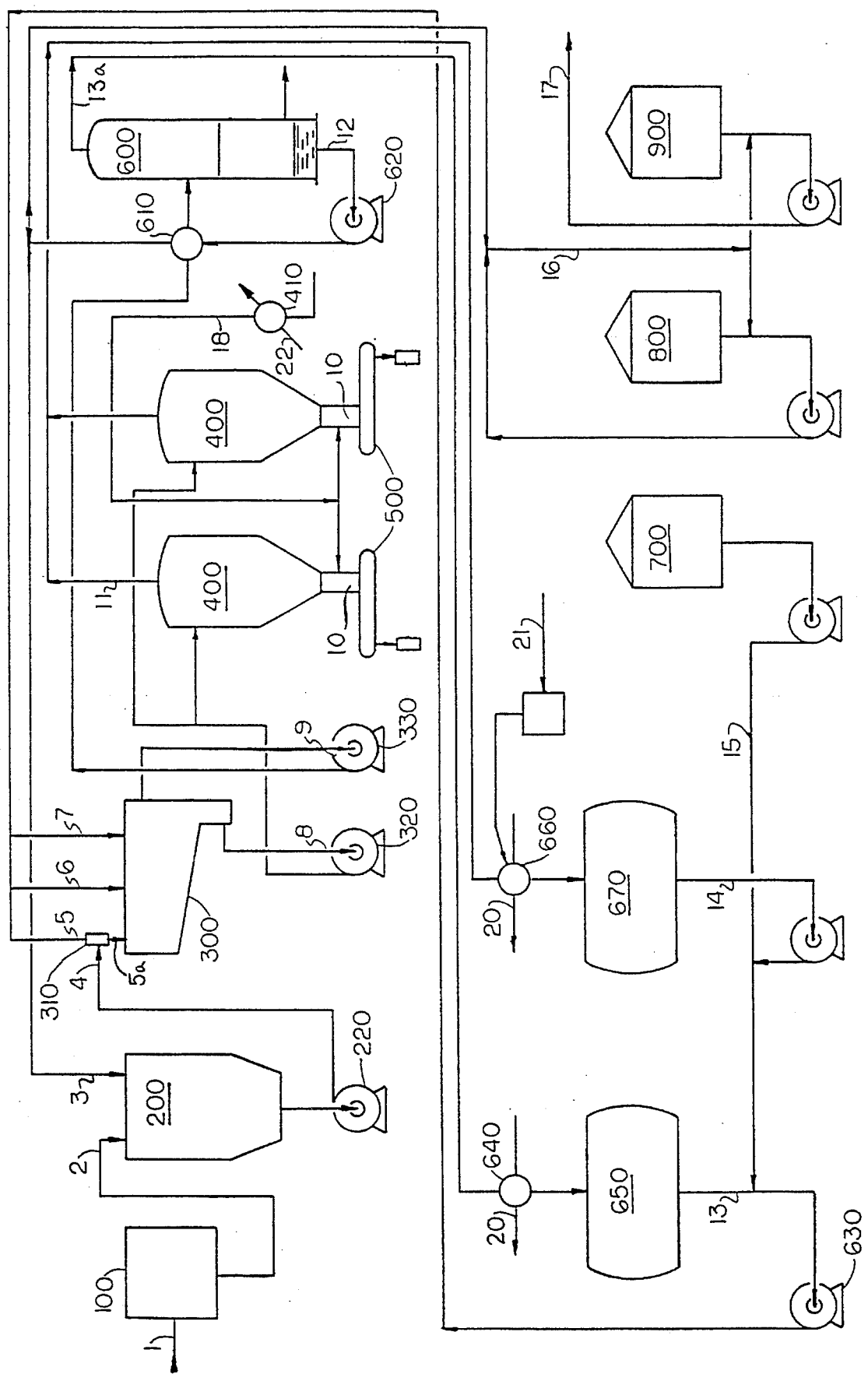
FIG. 1 is a schematic flow sheet illustrating a preferred embodiment of the invention.

Referring now to FIG. 1, the incoming stream 1 which comprises a mixture of spent catalyst and oil enters the catalyst oil storage tank 100. Streams 1 and 2 typically comprise between 10 and 90 percent by weight oil and between 90 and 10 percent by weight spent catalyst, and more typically about 50 weight percent spent catalyst. Because the method and apparatus of the present invention can operate in either batch mode, continuous mode, or in semi-batch mode, the catalyst oil storage tank 100 stores variable amounts of the incoming stream and releases it at the desired rate according to the mode of operation of the present invention.

Stream 2, comprising essentially the same mix as is stored in tank 100, is sent to a mixer 200, where it is mixed with sufficient recycled oil from stream 3 to achieve a mixture that is preferably at least about 66 weight percent oil and about 34 weight percent catalyst. While it is not necessary for the success of the process to achieve a particular weight percent, it is desired to add sufficient recycled oil so that the mixture exiting mixer 200 in stream 4 has a consistency which is easily pumpable. Stream 3, which contains recycled oil, is diverted from the final product stream as discussed below. Stream 4 leaves mixer 200 and is pumped by pump 220 through passive mixer 310, wherein it is mixed with a solvent stream 5, producing stream 5a, which flows into mix tank 300.

The solvent may be any substance that is liquid at ambient temperatures and will dissolve the desired oil, and is preferably a saturated hydrocarbon having between 4 and 8 carbon atoms, and is most preferably hexane. Unsaturated hydrocarbons are acceptable, although saturated hydrocarbons are preferred. It is further preferred that the solvent not be an aromatic molecule because of associated health hazards. The solvent may also be liquid propane.

Figure 2:
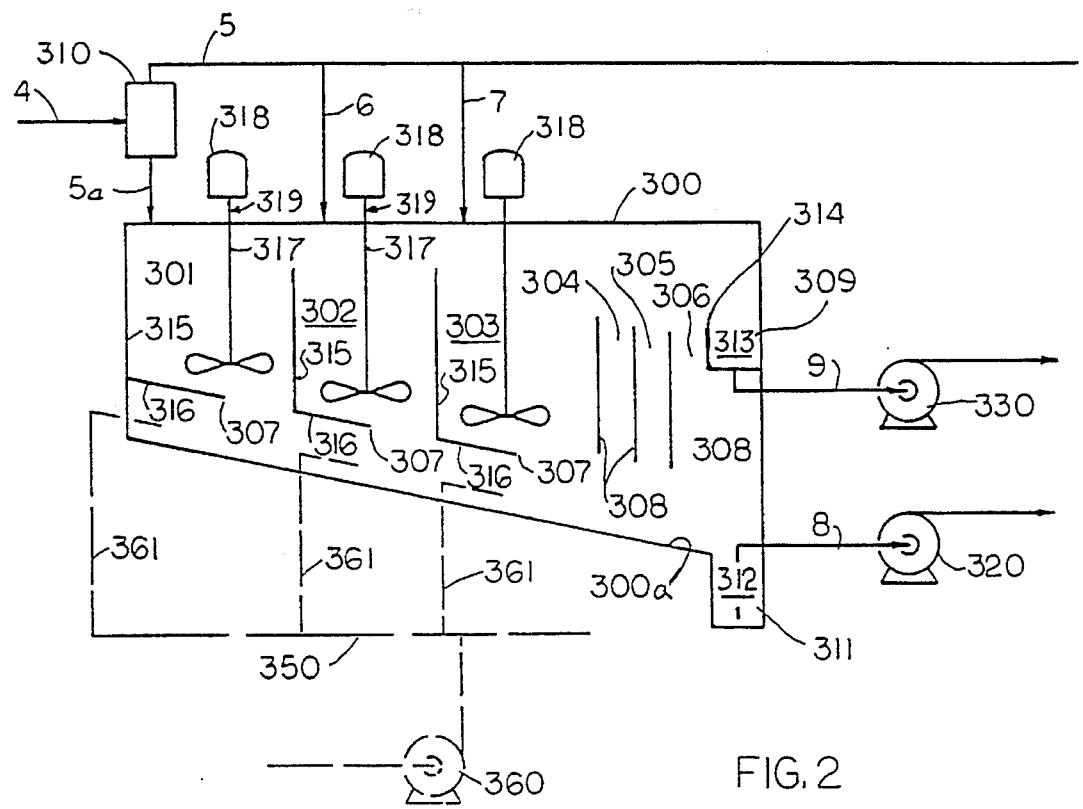
FIG. 2 is a schematic drawing of a preferred embodiment of the mix tank.

As shown in FIG. 2, mix tank 300 has a plurality of, and preferably at least 3, mix zones 301, 302, 303 in which a stream enters the mixer and settling zones 304, 305, 306. The mix zones 301, 302, 303 and settling zones 304, 305, 306 are defined by the arrangement of a plurality of internal baffles 307, 308 within the mix tank. Baffles 307 each comprise a vertical section 315 and a section 316 which is substantially parallel to the floor 300a of the tank. Baffles 308 are substantially vertical, and shield the downstream end of the tank from agitation so that catalyst solids settle out in that section of the tank.

In one embodiment, the floor 300a of the mix tank is inclined with respect to horizontal, with the upstream end of the tank being higher than the downstream end, so that the catalyst which settles out of the catalyst/oil/solvent mix tends to drift toward the downstream end of the tank. Additionally, it is preferred that a suction leg 311 and a suction pan 309 be formed at the downstream end of the mix tank. Suction leg 311 comprises a well 312 at the lowest point of the mixer, while suction pan 309 comprises a chamber 313 near the surface of the fluid within the tank, so that oil-containing solvent flows over the lip 314 of the chamber and the greatest degree of gravity separation is obtained between the suction leg and the suction pen.

In a preferred embodiment, the stream 5a leaving mixer 310 enters the first mix zone. It is preferred that mixer 310 be a line mixer or a passive mixer. In the second and third mix zones 302, 303, the incoming streams 6 and 7 comprise additional solvent. In each mix zone, the incoming stream is blended into the mixture in the tank by a mixer 319, which may be any type mixer known in the art, such as mechanical or fluid type mixers, and is preferably a rotating paddle 317 driven by motor 318.

In a preferred embodiment, a solvent wash system 350 is included, as shown in phantom in FIG. 2, that pumps additional solvent through pump 360, to be flowed across the floor of the mix tank 300 via streams 361, in order to help prevent buildup of catalyst solids within the mixer. The solvent flow can be turned on intermittently or run continuously, to carry the solids toward the suction leg 311 as they settle out. The solvent stream for the solvent wash system can be diverted from stream 5, 6, or 7, or from any of the solvent streams in the system.

In the mix tank 300, the solvent acts to dissolve the oil and wash it from the solid catalyst and also reduces the surface tension of the oil so that it can escape from between the catalyst particles. The mix tank is constructed so that two streams 8, 9 leave its downstream end, from the suction leg and suction pan, respectively.

Stream 8, which is wet washed catalyst that has settled out between the baffles 305 and 306, preferably comprises as high a weight percent of catalyst as is easily attainable through conventional settling type separation, and is preferably at least 80 weight percent catalyst solids, and more preferably at least 95 weight percent catalyst, with the balance being oil-containing solvent. Stream 9, which is pumped from the suction pan 309 of mix tank 300, is a liquid comprising preferably approximately fifty weight percent solvent and approximately fifty weight percent oil, and essentially no catalyst.

It will be understood that the particular embodiment of the mix tank shown in FIG. 2 is only a preferred embodiment, and does not limit the scope of the invention. The number and content of the feed lines, the number and arrangement of the internal baffles 307, 308, the mixing means, the catalyst separation means, the content of exit lines 8 and 9, and other variables can be changed without affecting the operability of the invention.

Figure 3:
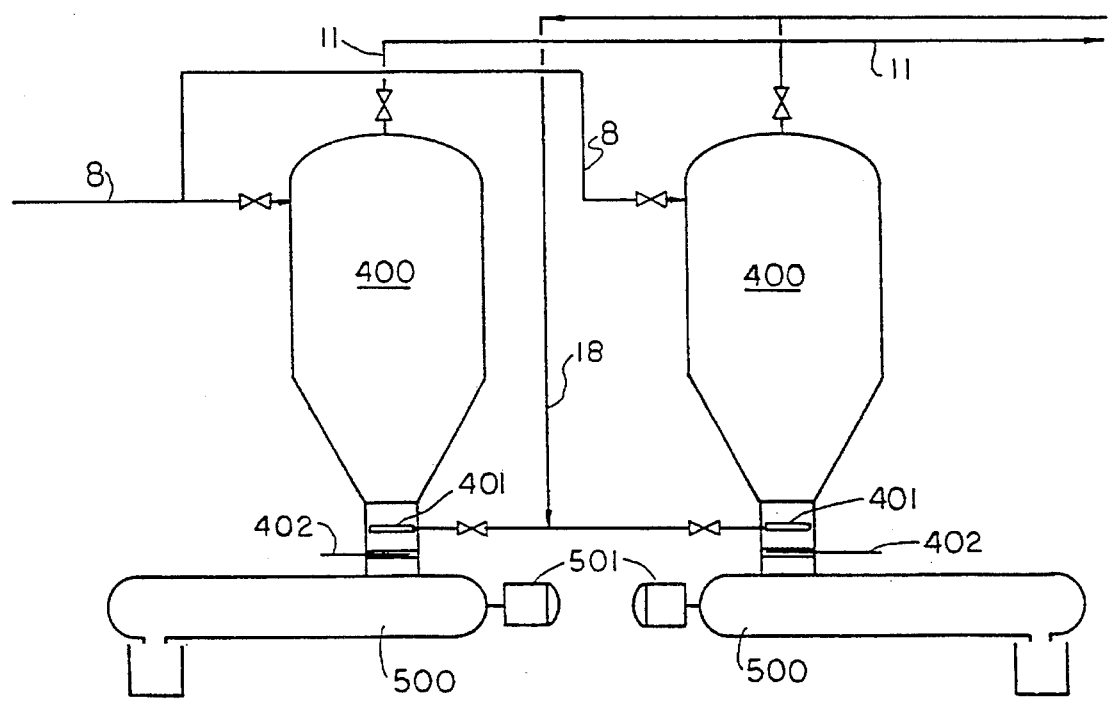
FIG. 3 is a schematic drawing of a preferred embodiment of the vacuum dryers.

As best shown in FIG. 3, wet catalyst stream 8 is pumped by pump 320 to one of two vacuum dryers 400 which operate in batch mode, in parallel and alternately, so that while one vacuum dryer is receiving material, the other is discharging dried solid catalyst to screw conveyor 500. In the vacuum dryers 400 low pressure, preferably below 5 psia, is maintained. When stream 8 enters a vacuum dryer, approximately between 30 and 60 percent of the solvent in the stream flashes out of the liquid phase and is removed through the vacuum stream line 11. The partially dried material is stripped of the remaining solvent by contact with a hot inert gas, such as nitrogen which enters dryer 400 via nitrogen stream 18. The stripping serves to ensure that no solvent leaves the vacuum system with the dried catalyst.

The inert gas for stripping is preferably heated to at least 200° F., by passage through a heat exchanger 410 through which steam is concurrently passed via stream 22. The hot gas is sparged through sparger ring 401 into the bed of catalyst that accumulates in the bottom of the dryer, and exits the dryer along with stream 11.

When the capacity of one dryer is reached, that dryer switches into discharge mode and the other vacuum dryer switches into receiving mode, so that the continuous operation of the rest of the apparatus can be maintained. Each vacuum dryer 400 is equipped with a valve 402, which is preferably a slide valve, which isolates the vacuum system in that dryer when closed and allows the discharge of dry catalyst from the dryer when open. The stripped catalyst from the dryer in discharge mode exits that vacuum dryer via stream 10 into screw conveyor 500. Screw conveyors 500 are driven by drive motors 501. It will be understood that other means of dry material handling, such as hoppers, conveyor belts or chutes, can be substituted for the screw conveyors 500 and motors 501 of the present invention, without affecting the operability of the invention.

Stream 10 comprises at least 90 percent dry catalyst, preferably above 99 percent dry catalyst. It is preferred but not necessary that a relatively insignificant amount of oil remain in the dried catalyst, on the order of one drop per two ounces of catalyst, in order to reduce handling problems associated with a completely dry powder. The catalyst of stream 10, typically nickel oxide, is in a form which is salable to other industries, such as the steel industry.

Steam may be passed via line through a vacuum system to pull a vacuum on vacuum dryers 400 and 401. The solvent stream which is flashed in vacuum dryers 400 and 401 is passed in stream 11 through a cooling water heat exchanger 660 and a condenser 670 and can be stored for later use or blended with the solvent stream 13 leaving condenser 650 for immediate recycle. Make-up solvent from solvent tank 700 may be added to solvent stream 13 via make-up stream 15. The noncondensable portion of stream 11, which contains mostly nitrogen, may be incinerated.

Stream 9, comprising oil-containing solvent, leaves mix tank 300 and is pumped by pump 330 to solvent fractionation column 600. Before entering solvent fractionation column 600, stream 9 is preheated in a cross-flow heat exchanger 610, in heat-exchange relationship with bottoms stream 12 which is transferred by pump 620 from the bottom of column 600. The solvent fractionation column 600 may be any form of distillation column, such as are well known in the art. The fractionation column 600 operates to separate the solvent from the oil dissolved in it and operates at suitable temperatures therefor. The bottom of the column is at a higher temperature than the top of the column and at such a temperature whereby substantially no solvent remains in stream 12 leaving the bottom of the column. Stream 12, then, contains the bulk of the oil removed from the catalyst. As discussed above, stream 12 passes through cross-flow heat exchanger 610 in which it is cooled by transferal of its latent heat to feed stream 9. The cooled oil of stream 12 is then either sent to oil storage tank 800 or oil sales tank 900 via stream 16 or recycled via stream 3, or divided between recycle and storage, depending on the consistency of the feed catalyst/oil slurry, stream 1. Stored oil can be sold via line 17.

The solvent portion of stream 9 that is removed from the top of the fractionation column via stream 13a passes through heat exchanger 640, where it is cooled by exchange with cooling water 20, and then into a condenser 650 wherein it is condensed to form recycle stream 13. Stream 13 joins stream 14 and is pumped by pump 630 to feed recycle streams 5, 6, and 7.

EXAMPLE 1

An apparatus for carrying out the separation of oil from catalyst according to the method of the present invention is set up as shown in FIG. 1, and 2. Material and energy balances for the various streams result in the data shown in Table 1. The system disclosed in this Example consumes approximately 5,000 pounds per hour of 50 pound steam.

TABLE 1

| Stream No. | Stream Content | Density #/ft$^3$ | Pounds per hour | GPM | Pressure (psig) | Temp (°F.) |
|---|---|---|---|---|---|---|
| 1 | Cat./Oil Unloading | 236.6 | | | | |
| 2 | Cat./Oil Feed | 236.6 | 4168 | | Atmos. | 70 |
| 3 | Oil Recycle | 57.0 | 2100 | 4.59 | Atmos. | 125 |
| 4 | cat./Oil+ Oil Feed | 157.5 | 6267 | 4.96 | 15 | 88 |
| 5 | Solvent Feed | 41.4 | 2760 | 8.31 | 15 | 120 |
| 6 | Solvent Feed | 41.4 | 1380 | 4.16 | 5 | 120 |
| 7 | Solvent Feed | 41.4 | 1380 | 4.15 | 5 | 120 |
| 8 | Cat. & Solvent | 377.4 | 2374 | 0.8 | 1 | 105 |
| 9 | Oil & Solvent | 48.3 | 9414 | 24.3 | 1 | 105 |
| 10 | Dry Cat. | 411.0 | 2124 | — | Atmos. | 110 |
| 11 | Vac. Dryer Solvent | 41.4 | 250 | .753 | 4 psia | 110 |
| 12 | Oil | 57.0 | 4144 | 9.06 | 5 | 155 |
| 13 | Solvent (Frac. | 41.4 | 5270 | 15.9 | 5 | 120 |
| 14 | Solvent (Vac.) | 41.4 | 250 | .753 | 4 psia | 110 |
| 15 | Solvent Makeup | 0 | 0 | 0 | 20 | 100 |
| 16 | Oil to Storage | 57.0 | 2044 | 4.47 | 5 | 120 |
| 17 | Oil to Sales | 57.0 | 2044 | 4.47 | 25 | 120 |
| 18 | Nitrogen | | | | 35 | 250 |
| 19 | Steam | | | | 50 | 300 |
| 20 | Cooling Water | | | | 35 | 90 |
| 21 | Steam | | | | 50 | 300 |

TABLE 1-continued

| Stream No. | Stream Content | Density #/ft³ | Pounds per hour | GPM | Pressure (psig) | Temp (°F.) |
|---|---|---|---|---|---|---|
| 22 | Steam | | | | 50 | 300 |

While the invention is described with respect to specific embodiments, modifications thereof can be made by one skilled in the art without departing from the spirit of the invention. The details of said embodiments are not to be construed a limitation except to the extent indicated in the following claims.

What is claimed is:

1. An apparatus for recovering oil from a catalyst/oil mix, comprising:

a mixer for mixing the catalyst/oil mix with a solvent to dissolve the oil, overall catalyst flow through said mixer being substantially horizontal;

vertical baffles in the mixer for separating wet catalyst from solvent and dissolved oil, said baffles defining at least one upstream region and at least one downstream region that is shielded from said upstream region to enhance settling, said upstream region including a mixing zone and a settling zone;

floor baffles in said mixing zone, said floor baffles being parallel to the floor of the mixer and positioned below the lower ends of said vertical baffles;

means for flowing additional solvent across the floor of the mixer below the floor baffles and parallel to said floor;

a suction leg at the lowest point on the mixer for removing a stream consisting primarily of wet catalyst;

a suction pan near the surface of the fluid in the mixer for removing a stream consisting primarily of solvent and oil;

means for removing the wet catalyst from the mixer;

means for drying the wet catalyst to produce dry catalyst;

means for separating dissolved oil from the solvent; and means for recovering the oil and the solvent in a reusable form.

2. The apparatus of claim 1 wherein said upstream region is shielded from said downstream region by substantially vertical baffles and said settling zone is shielded from said mixing zone by said floor baffles.

3. The apparatus of claim 2 wherein the drying means comprises a vacuum dryer.

4. The apparatus of claim 2 wherein the drying means comprises a hot inert gas stripper.

5. The apparatus of claim 2 wherein the drying means comprises a combination of a vacuum dryer and a hot inert gas stripper.

6. The apparatus of claim 2 wherein the separating means comprises a fractionation column.

7. The apparatus of claim 2, including a preheater through which the solvent containing dissolved oil and the oil which has been separated from the solvent pass in a heat exchanging relationship.

8. The apparatus of claim 2 wherein the recovery means includes cooling and condensing means.

* * * * *